US011689472B2

(12) United States Patent
Karri et al.

(10) Patent No.: US 11,689,472 B2
(45) Date of Patent: Jun. 27, 2023

(54) DYNAMIC ALLOCATION OF COMPUTING RESOURCES

(71) Applicant: INTERNATIONAL BUSINESS MACHINES CORPORATION, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Ryan Jackson, Philadelphia, PA (US); Ram Kumar Vadlamani, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/305,523

(22) Filed: Jul. 9, 2021

(65) Prior Publication Data
US 2023/0015531 A1 Jan. 19, 2023

(51) Int. Cl.
*H04L 47/762* (2022.01)
*H04L 47/78* (2022.01)
*H04L 47/80* (2022.01)
*H04L 47/70* (2022.01)
*G06F 18/214* (2023.01)

(52) U.S. Cl.
CPC .......... *H04L 47/762* (2013.01); *G06F 18/214* (2023.01); *H04L 47/781* (2013.01); *H04L 47/808* (2013.01); *H04L 47/822* (2013.01)

(58) Field of Classification Search
CPC ... H04L 47/762; H04L 47/781; H04L 47/808; H04L 47/822; H04L 2012/563; G06K 9/6256
See application file for complete search history.

(56) References Cited

U.S. PATENT DOCUMENTS

| 10,209,974 B1 * | 2/2019 | Patton ....................... G06F 8/60 |
| 2009/0022130 A1 | 1/2009 | Yu |
| 2011/0283080 A1 | 11/2011 | Lim |

(Continued)

FOREIGN PATENT DOCUMENTS

| KR | 101785972 B1 | 10/2017 | |
| WO | WO-2013004497 A1 * | 1/2013 | ........... H04L 47/823 |

OTHER PUBLICATIONS

Disclosed Anonymousley, "Context-Aware Task Transfer to Other Devices to Achieve Performance Equal to the User's Last Best Experience", https://priorart.ip.com/IPCOM/000263849, Oct. 9, 2020, pp. 1-4.

(Continued)

*Primary Examiner* — Glenton B Burgess
*Assistant Examiner* — Jihad K Boustany
(74) *Attorney, Agent, or Firm* — Steven M. Bouknight (57) ABSTRACT

The exemplary embodiments disclose a method, a computer program product, and a computer system for allocating computing resources. The exemplary embodiments may include collecting data of one or more users, wherein the collected data comprises calendar data of the one or more users, extracting one or more features from the collected data, and allocating one or more computing resources to one or more of the users based on the extracted one or more features and one or more models.

17 Claims, 6 Drawing Sheets

(56) References Cited

U.S. PATENT DOCUMENTS

| | | | | |
|---|---|---|---|---|
| 2014/0025380 A1* | 1/2014 | Koch | ............... | G10L 15/30 |
| | | | | 704/E15.005 |
| 2019/0236555 A1* | 8/2019 | Bennett | ............... | G06F 3/0482 |
| 2019/0340579 A1* | 11/2019 | Krystek | ............... | G06N 7/005 |
| 2020/0258029 A1* | 8/2020 | Jung | ............... | G06Q 10/06314 |
| 2022/0060430 A1* | 2/2022 | Milton | ............... | H04L 47/781 |
| 2022/0100453 A1* | 3/2022 | Miraj | ............... | G06F 1/1694 |

OTHER PUBLICATIONS

Disclosed Anonymously, "An Intelligent Resource Allocation System Based on Dynamic User Requirements", https://priorart.ip.com/IPCOM/000263659, Sep. 24, 2020, pp. 1-3.

Mell et al., "The NIST Definition of Cloud Computing", National Institute of Standards and Technology, Special Publication 800-145, Sep. 2011, pp. 1-7.

\* cited by examiner

DYNAMIC ALLOCATION OF COMPUTING RESOURCES

BACKGROUND

The exemplary embodiments relate generally to computing resources, and more particularly to the allocation of computing resources.

Multiple people may utilize a single computer simultaneously or in tandem. A person may multitask by performing one or more tasks that require computing resources and one or more tasks that do not require computing resources simultaneously or in tandem. It is often difficult to coordinate the use of computers and computing resources among multiple people or among multiple tasks.

SUMMARY

The exemplary embodiments disclose a method, a computer program product, and a computer system for allocating computing resources. The exemplary embodiments may include collecting data of one or more users, wherein the collected data comprises calendar data of the one or more users, extracting one or more features from the collected data, and allocating one or more computing resources to one or more of the users based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Multiple people may utilize a single computer simultaneously or in tandem. A person may multitask by performing one or more tasks that require computing resources and one or more tasks that do not require computing resources simultaneously or in tandem. It is often difficult to coordinate the use of computers and computing resources among multiple people or among multiple tasks.

Exemplary embodiments are directed to a method, computer program product, and computer system for allocating computing resources. In embodiments, machine learning may be used to create models capable of allocating computing resources, while feedback loops may improve upon such models. Moreover, data from user uploads, databases, or the sensors 124 may be used to properly allocate computing resources. One or more users may wish to efficiently allocate computing resources for one or more computing smart device 120s for a number of purposes. For example, multiple users may share one computer in a research laboratory and waste time waiting for other users to finish using the computer so that they can use it afterwards. The multiple users may instead wish to coordinate laboratory experiments such that the computer will be available when needed by each individual user. In another example, two users may each have access to separate computers, but the first user may be performing a computationally intensive task and the second user may not be performing any tasks that are computationally intensive. The two users may wish that the second user's computer could assist with the first user's computationally intensive task to minimize waiting time or delay for the first user. In embodiments, computational resources to be allocated may include cloud computing, edge computing, and/or local computing resources. In general, it will be appreciated that embodiments described herein may relate to the allocation of any computing resource (i.e., processing memory, internet bandwidth, power, etc.) within any environment and for any motivation.

Figure 1:
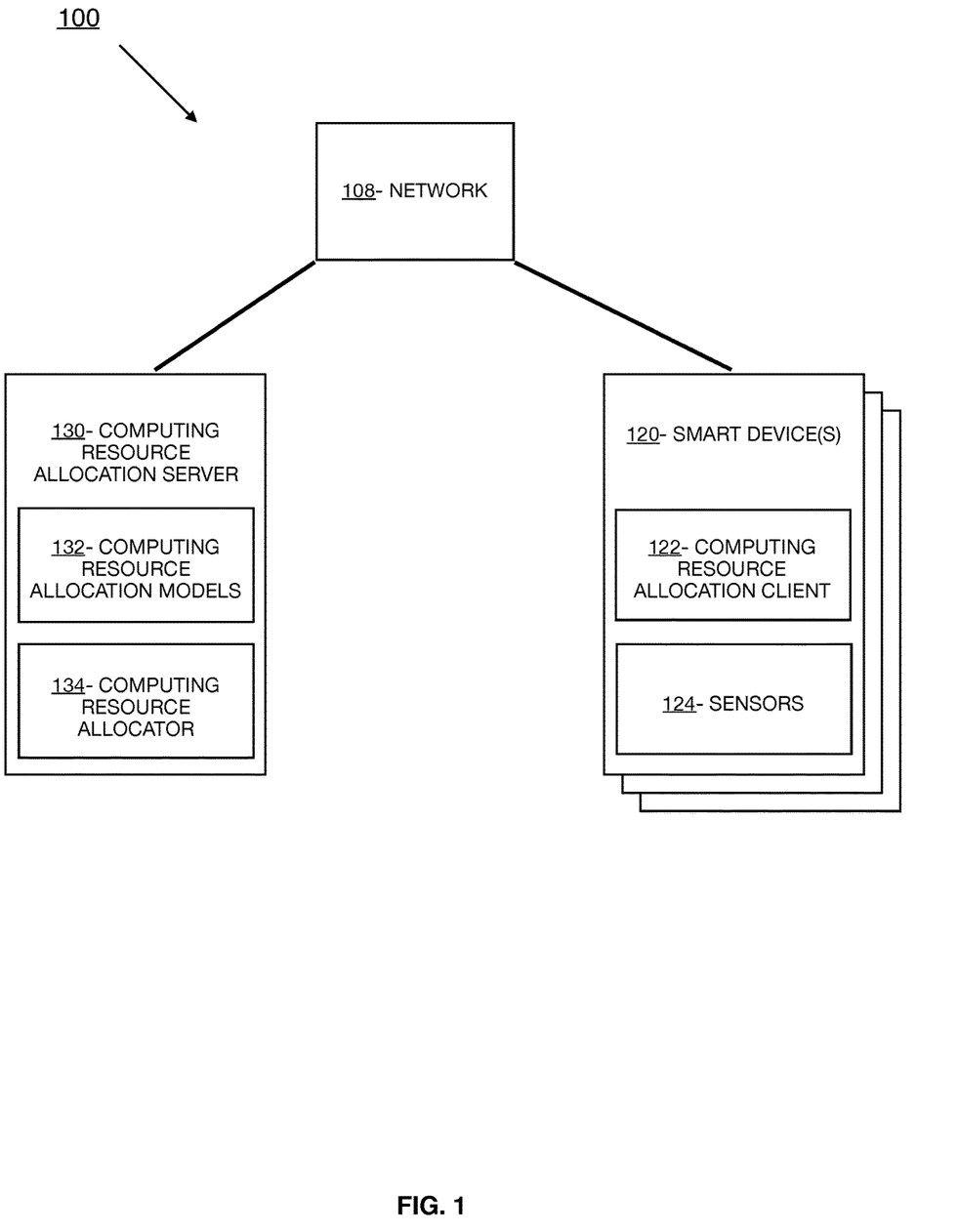
FIG. 1 depicts an exemplary schematic diagram of a computing resource allocation system 100, in accordance with the exemplary embodiments.

FIG. 1 depicts the computing resource allocation system 100, in accordance with the exemplary embodiments. According to the exemplary embodiments, the computing resource allocation system 100 may include a smart device 120 and a computing resource allocation server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the computing resource allocation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a computing resource allocation client 122 and one or more sensors 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The computing resource allocation client 122 may act as a client in a client-server relationship with a server, for example a computing resource allocation server 130. The computing resource allocation client 122 may also be a software and/or hardware application capable of communicating with and providing a user interface for a user to interact with a server via the network 108. Moreover, in the example embodiment, the computing resource allocation client 122 may be capable of transferring data from the sensors 124 between the smart device 120 and other devices via the network 108. In embodiments, the computing resource allocation client 122 utilizes various wired and wireless connection protocols for data transmission and exchange, including Bluetooth, 2.4 gHz and 5 gHz internet, near-field communication, Z-Wave, Zigbee, etc. The computing resource allocation client 122 is described in greater detail with respect to FIG. 2.

In example embodiments, the sensors 124 may comprise a camera, microphone, light sensor, infrared sensor, movement detection sensor, or other sensory hardware equipment. Moreover, the smart device 120 may incorporate an array of the one or more sensors 124 such that information can be obtained by the sensors 124 in multiple directions, at different times/intervals, in different mediums/frequencies, and the like. For example, the smart device 120 may include three forward-facing cameras that each record an adjacent sixty-degree viewing angle spanning a total of one-hundred and eighty degrees in the direction of a user. Moreover, data processing techniques may be implemented such that directional information of visual and audio data can be obtained based on signals received by each of the three sensors 124, such as trilateration and triangulation.

While the sensors 124 are depicted as integrated with the smart device 120, in embodiments, the sensors 124 may be incorporated within an environment in which the computing resource allocation system 100 is implemented. For example, the sensors 124 may be one or more microphones built into an auditorium, a camera built into a facility, etc. Moreover, data processing techniques may be implemented such that directional information of visual and audio data can be obtained based on signals received by each of the sensors 124, such as trilateration and triangulation. In other embodiments, the sensors 124 may be integrated with other smart devices, e.g., smart phones and laptops, within an environment implementing the computing resource allocation system 100. In such embodiments, the sensors 124 may communicate directly with other networks and devices, such as the network 108. The sensors 124 are described in greater detail as a hardware implementation with reference to FIG. 4, as part of a cloud implementation with reference to FIG. 5, and/or as utilizing functional abstraction layers for processing with reference to FIG. 6.

In the exemplary embodiments, the computing resource allocation server 130 may include one or more computing resource allocation models 132 and a computing resource allocator 134, and may act as a server in a client-server relationship with the computing resource allocation client 122. The computing resource allocation server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the computing resource allocation server 130 is shown as a single device, in other embodiments, the computing resource allocation server 130 may be comprised of a cluster or plurality of computing devices, working together or working independently. The computing resource allocation server 130 is described in greater detail as a hardware implementation with reference to FIG. 4, as part of a cloud implementation with reference to FIG. 5, and/or as utilizing functional abstraction layers for processing with reference to FIG. 6.

The computing resource allocation models 132 may be one or more algorithms modelling a correlation between one or more features detected by the sensors 124 and an appropriate allocation of computing resources. In the example embodiment, the computing resource allocation models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more features being indicative of an appropriate or efficient allocation of computing resources. In embodiments, such features may include features such as computing tasks and their projected start times, completion times, durations, workflow sequences or dependencies, computing resources required, non-computing resources required, priority levels, etc. The computing resource allocation models 132 may weight the features based on an effect that the features have on appropriately allocating computing resources.

In the exemplary embodiments, the computing resource allocator 134 may be a software and/or hardware program capable of collecting training data, extracting features from the training data, and training one or more models based on the extracted features. The computing resource allocator 134 may additionally be capable of configuring a session and collecting data, extracting features from the collected data, and applying one or more models to the extracted features to allocate computing resources. Moreover, the computing resource allocator 134 may be further configured for notifying the user of one or more computing resource allocations, evaluating whether the one or more computing resource allocations were appropriate, and adjusting the one or more models. The computing resource allocator 134 is described in greater detail with reference to FIG. 2.

Figure 2:
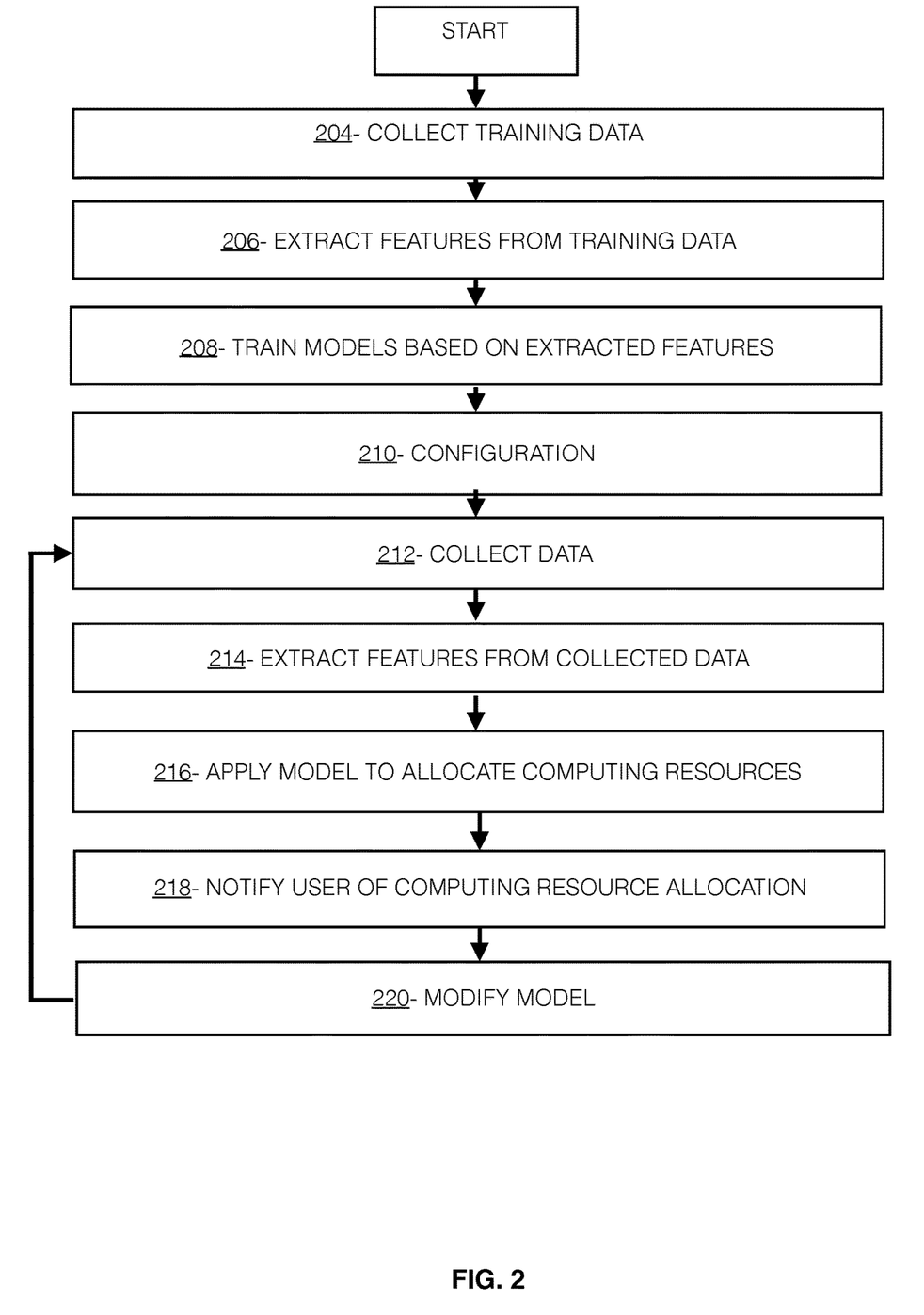
FIG. 2 depicts an exemplary flowchart illustrating the operations of a computing resource allocator 134 of the computing resource allocation system 100 in allocating computing resources, in accordance with the exemplary embodiments.

FIG. 2 depicts an exemplary flowchart illustrating the operations of a computing resource allocator 134 of the computing resource allocation system 100 in allocating computing resources, in accordance with the exemplary embodiments. In exemplary embodiments, the computing resource allocator 134 first implements a training phase in which it trains the computing resource allocation models 132 using training data including various input data (i.e., user schedules, tasks, etc.) and associated appropriate computing resource allocation. The computing resource allocator 134 then moves on to an operational phase in which it applies the trained computing resource allocation models 132 to current data in order to appropriately allocate computing resources.

The computing resource allocator 134 may collect and/or receive training data (step 204). In embodiments, training data may include data such as one or more smart device 120 usage data, audio and video collected from one or more sensors 124, user profile and calendar data, etc. The computing resource allocator 134 may retrieve training data via user upload, databases, or the sensors 124. In embodiments, the computing resource allocator 134 may collect training data via the sensors 124 as one or more microphones built into an auditorium, a camera built into a facility, etc. For example, microphone sensors 124 may collect audio of a user saying, "after this file downloads, I need to print it before I can begin this task." In embodiments, collected training data may be labelled or associated with one or more appropriate computing resource allocations. For example, collected training data of user interactions with computing devices may be labelled with "prioritize bandwidth for file download," "prioritize bandwidth for video call," "prioritize power supply for server," "prioritize memory for computation," etc. In embodiments, collected training data may also be associated to one or more users. For example, training data of John's smart device 120 usage activity may be labelled with, "user: John." The computing resource allocator 134 may collect training data associated with specific users to later train different computing resource allocation models 132 for different users based on the users' preferences, characteristics, and/or tendencies (i.e., John may tend to print recently downloaded files, while Rachel may not).

To further illustrate the operations of the computing resource allocator 134, reference is now made to an illustrative example where the computing resource allocator 134 collects training data consisting of various user interactions with one or more computing smart device 120s and associated appropriate computing resource allocations.

The computing resource allocator 134 may extract one or more features from the collected and/or received training data (step 206). The extracted features may be extracted from the collected training data, which may be collected via user upload, databases, or the sensors 124, and may include features such as computing tasks and their projected start times, completion times, durations, workflow sequences or dependencies, computing resources required, non-computing resources required, priority levels, etc. In embodiments, computing tasks may refer to cloud computing tasks, edge computing tasks, and/or local computing tasks. In embodiments, the computing resource allocator 134 may use techniques such as feature extraction, natural language processing, optical character recognition, image processing, audio processing, pattern/template matching, data comparison, etc. to identify features. For example, the computing resource allocator 134 may use feature extraction, optical character recognition, and data comparison to extract tasks, projected start times, completion times, durations, workflow sequences or dependencies, computing resources required, non-computing resources required, priority levels, etc. directly from user calendars (i.e., event scheduling and description). The computing resource allocator 134 may additionally utilize image processing, audio processing, video processing, and natural language processing to extract features from collected audio and/or video. For example, the computing resource allocator 134 may utilize audio and video processing to extract tasks and projected start times, completion times, estimated durations, workflow sequences or dependencies, computing resources required, non-computing resources required, priority levels, etc. from collected user speech audio and video. The computing resource allocator 134 may later associate extracted features with associated allocations of computing resources when training one or more models.

With reference to the previously introduced example where the computing resource allocator 134 collects training data consisting of various user interactions with one or more computing smart device 120s and associated appropriate computing resource allocations, the computing resource allocator 134 extracts features computing tasks and their projected start times, completion times, durations, workflow sequences or dependencies, computing resources required, non-computing resources required, priority levels, etc. from the collected training data.

The computing resource allocator 134 may train one or more computing resource allocation models 132 based on the extracted features (step 208). The computing resource allocator 134 may train one or more computing resource allocation models 132 based on an association of the one or more extracted features with one or more computing resource allocations. As previously mentioned, such extracted features may include computing tasks and their projected start times, completion times, durations, workflow sequences or dependencies, computing resources required, non-computing resources required, priority levels, etc. and the one or more computing resource allocation models 132 may be generated through machine learning techniques such as convolutional neural networks. Moreover, the computing resource allocator 134 may train the one or more computing resource allocation models 132 to weight the features such that features shown to have a greater correlation with an appropriate computing resource allocation are weighted greater than those features that are not. Moreover, the computing resource allocator 134 may train different computing resource allocation models 132 for different users based on users' preferences, characteristics, and/or tendencies. Based on the computing resource allocation models 132's extracted features and weights associated with such extracted features, the computing resource allocator 134 may later determine an appropriate computing resource allocation.

With reference to the previously introduced example where the computing resource allocator 134 extracts features computing tasks and their projected start times, completion times, durations, workflow sequences or dependencies, computing resources required, non-computing resources required, priority levels, etc. from the collected training data, the computing resource allocator 134 trains a model based on an association of the extracted features with appropriate computing resource allocations.

The computing resource allocator 134 may receive a configuration (step 210). The computing resource allocator 134 may receive a configuration by receiving a user registration and user preferences. The user registration may be uploaded by one or more user, i.e., one or more people using one or more computing smart device 120s, and the configuration may be received by the computing resource allocator 134 via the computing resource allocation client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, types of the sensors 124, and the like. Lastly, the computing resource allocator 134 may receive a configuration of the one or more sensors 124, whether they be fixed to one or more devices (e.g., the smart device 120) or fixed within an environment in which the computing resource allocation system 100 is implemented.

During configuration, the computing resource allocator 134 may further receive user preferences (step 210 continued). User preferences may include preferences for the manner in which the computing resource allocator 134 should notify one or more users of a computing resource allocation. For example, a user may upload user preferences specifying that they are to be notified of a computing resource allocation via visual notification on a screen of their smart device 120. In embodiments, user preferences may additionally specify that upon determination of one or more computing resource allocations, the computing resource allocator 13 is to implement the allocation (i.e., restrict bandwidth, cap memory usage, etc.). In embodiments, user preferences may alternatively specify that user approval or confirmation must be received prior to the implementation of the determined computing resource allocation. In embodiments, user preferences may be configured alternatively.

With reference to the previously introduced example where the computing resource allocator 134 trains a model based on an association of the extracted features with appropriate computing resource allocation results, the user uploads a user registration including a first and second user's names, computers and shared printer as smart device 120s, and microphone and video cameras as sensors 124. The user also uploads user preferences specifying that notification of computing resource allocations are to be communicated to the first and second users via visual notification on their computers, and confirmation from both users must be received prior to implementing determined computer asset allocations.

The computing resource allocator 134 may collect data (step 212). The collected data may include usage data of one or more smart device 120s, audio and video collected from one or more sensors 124, user profile and calendar data, etc., and the computing resource allocator 134 may retrieve input data via user upload, databases, integration of the computing resource allocation client 122 with the operating system of one or more smart device 120s, or the one or more sensors 124. In embodiments, the computing resource allocator 134 may collect input data via the sensors 124 as one or more microphones built into an auditorium, a camera built into a facility, etc. For example, microphone sensors 124 may collect audio of a user saying, "after this file downloads, I still need to print it." The computing resource allocator 134 may collect input data to later extract features of the input data and apply one or more computing resource allocation models 132 to appropriately allocate one or more computing resources (i.e., processing memory, internet bandwidth, power, etc.).

With reference to the previously introduced example where the user uploads a user registration and user preferences, the computing resource allocator 134 collects calendar data of the first and second users as well as audio and video data of the users interacting with their computers (smart device 120s). The computing resource allocator 134 collects data of the first user downloading a large file on their computer (typically takes 45 minutes to download at maximum download speed) and performing an hour-long laboratory experiment that does not require computing resources in the meantime. The computing resource allocator 134 collects data of the second user downloading a small file on their computer which will then need to be printed in order for the second user to begin working on a task.

The computing resource allocator 134 may extract one or more features from the collected input data (step 214). The computing resource allocator 134 may extract one or more features from the collected input data in the same manner as described above with respect to extracting features from the training data. However, the computing resource allocator 134 extracts one or more features from the current collected input data instead of from the previously collected training data.

With reference to the previously introduced example where the computing resource allocator 134 collects data of the first and second users interacting with their computers (smart device 120s), the computing resource allocator 134 utilizes a convolutional neural network, audio and video processing, and optical character recognition to extract the features listed in Table 1 and Table 2 below.

TABLE 1

| First User Extracted Features | |
|---|---|
| Computing Tasks | Download Large File |
| Projected Start Time | 9:00 AM |
| Projected Completion Time | 9:45 AM |
| Duration | At least 45 minutes |

TABLE 1-continued

First User Extracted Features

| | |
|---|---|
| Computing Resources Required | Internet Bandwidth |
| Non-Computing Resources Required | None |
| Priority Level | Low (performing other task in meantime) |

TABLE 2

Second User Extracted Features

| | |
|---|---|
| Computing Tasks | Download Small File & Print File |
| Projected Start Time | 9:00 AM |
| Projected Completion Time | 9:15 AM |
| Duration | At least 15 minutes |
| Computing Resources Required | Internet Bandwidth |
| Non-Computing Resources Required | None |
| Priority Level | High (must download and print in order to begin task) |

The computing resource allocator 134 may apply one or more models to the extracted features to determine an appropriate computing resource allocation (step 216). As previously mentioned, such extracted features may include computing tasks and their projected start times, completion times, durations, workflow sequences or dependencies, computing resources required, non-computing resources required, priority levels, etc. and the one or more computing resource allocation models 132 may be generated through machine learning techniques such as neural networks. In embodiments, the one or more computing resource allocation models 132 may be trained at initialization and/or through the use of a feedback loop to weight the features such that features shown to have a greater correlation with appropriately allocating computing resources are weighted greater than those features that are not. Based on the extracted features and weights associated with such extracted features, the computing resource allocator 134 may determine one or more computing resource allocation results.

With reference to the previously introduced example where the computing resource allocator 134 extracts features of the collected data, the computing resource allocator 134 determines that the second user's computer should be prioritized with maximum bandwidth until the small file is downloaded, and then the first user's computer should be prioritized with maximum bandwidth afterwards.

Upon the computing resource allocator 134 allocating computing resources, the computing resource allocator 134 may notify the user of the one or more appropriate computing resource allocations (step 218). In embodiments, the computing resource allocator 134 may notify the user of appropriate computing resource allocations. The computing resource allocator 134 may convey the one or more appropriate asset allocations (i.e., bandwidth and/or memory and/or power, etc.) to the user in the form of audio, video, text, or any other manner via one or more of the smart device 120s or any other device. In embodiments, the computing resource allocator 134 may require approval from one or more users in order to implement the one or more determined computing resource allocations. In other embodiments, the computing resource allocator 134 may automatically implement the determined one or more computing resource allocations upon determination of the computing resource allocations. As previously discussed, the computing resource allocator 134 may notify a user according to the user preferences of configuration.

With reference to the previously introduced example where the computing resource allocator 134 determines that the second user's computer should be prioritized with maximum bandwidth until the small file is downloaded, and then the first user's computer should be prioritized with maximum bandwidth afterwards, the computing resource allocator 134 visually notifies both the first and second users on their corresponding computer smart device 120s that the most efficient computing resource allocation is to prioritize the second user's computer with maximum bandwidth until the small file is downloaded, and then prioritize the first user's computer with maximum bandwidth afterwards according to the user's preferences.

Upon the computing resource allocator 134 notifying the one or more users of appropriate computing resource allocations, the computing resource allocator 134 may evaluate and modify the computing resource allocation models 132 (step 220). In the example embodiment, the computing resource allocator 134 may verify whether the computing resource allocations were appropriate in order to provide a feedback loop for modifying the computing resource allocation models 132. In embodiments, the feedback loop may simply provide a means for a user to indicate whether the computing resource allocation seemed appropriate, accurate, helpful, etc. The feedback loop indication may be triggered via a toggle switch, button, slider, etc. that may be selected by the user manually by hand using a button/touchscreen/ etc., by voice, by eye movement, and the like. Based on the computing resource allocator 134 appropriately or inappropriately determining computing resource allocations, the computing resource allocator 134 may modify the computing resource allocation models 132 relating to determination of appropriate computing resource allocations. In other embodiments, the computing resource allocator 134 may infer or deduce whether the computing resource allocations were appropriate. For example, the computing resource allocator 134 may interpret user dialogue via natural language processing to determine whether the allocations were reasonable. For example, if the user says, "That isn't right," "No, don't do that" or other expressions indicative of dissatisfaction or disapproval, the computing resource allocator 134 may infer that the computing resource allocations were inappropriate and modify the computing resource allocation models 132 accordingly. Based on feedback received in the above or any other manners, the computing resource allocator 134 may then modify the computing resource allocation models 132 to more accurately allocate computing resources.

With reference to the previously introduced example where the computing resource allocator 134 visually notifies both the first and second users on their corresponding computer smart device 120s that the most efficient computing resource allocation is to prioritize the second user's computer with maximum bandwidth until the small file is downloaded, and then prioritize the first user's computer with maximum bandwidth afterwards according to the user's preferences, both the first and second users say, "Great, sounds good!" and the computing resource allocator 134 modifies the computing resource allocation models 132 accordingly.

Figure 3:
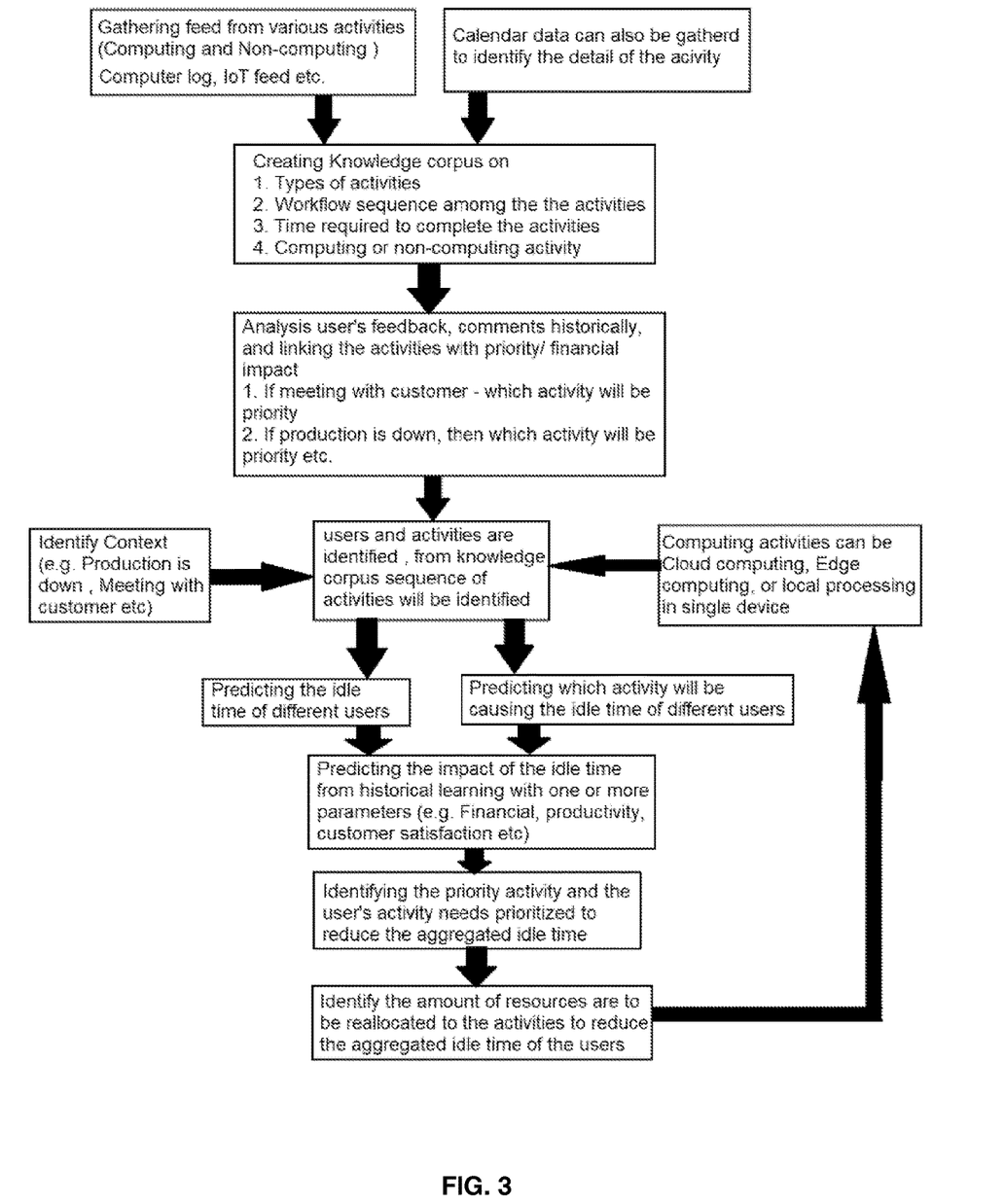
FIG. 3 depicts an exemplary flowchart illustrating the operations of a computing resource allocator 134 of the computing resource allocation system 100 in allocating computing resources, in accordance with the exemplary embodiments.

FIG. 3 depicts an exemplary flowchart illustrating the operations of a computing resource allocator 134 of the computing resource allocation system 100 in allocating computing resources, in accordance with the exemplary embodiments.

Figure 4:
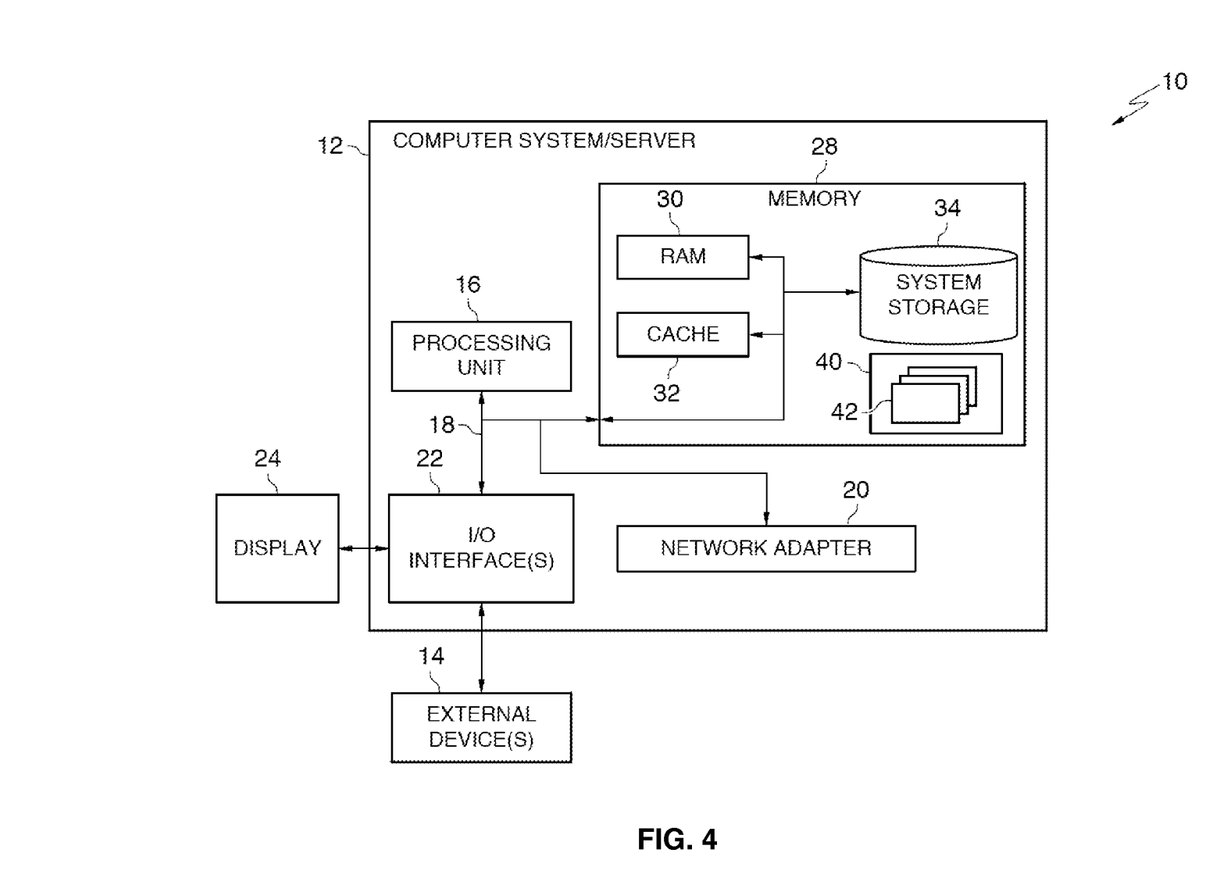
FIG. 4 depicts an exemplary block diagram depicting the hardware components of the computing resource allocation system 100 of FIG. 1, in accordance with the exemplary embodiments.

FIG. 4 depicts a block diagram of devices within the computing resource allocation system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
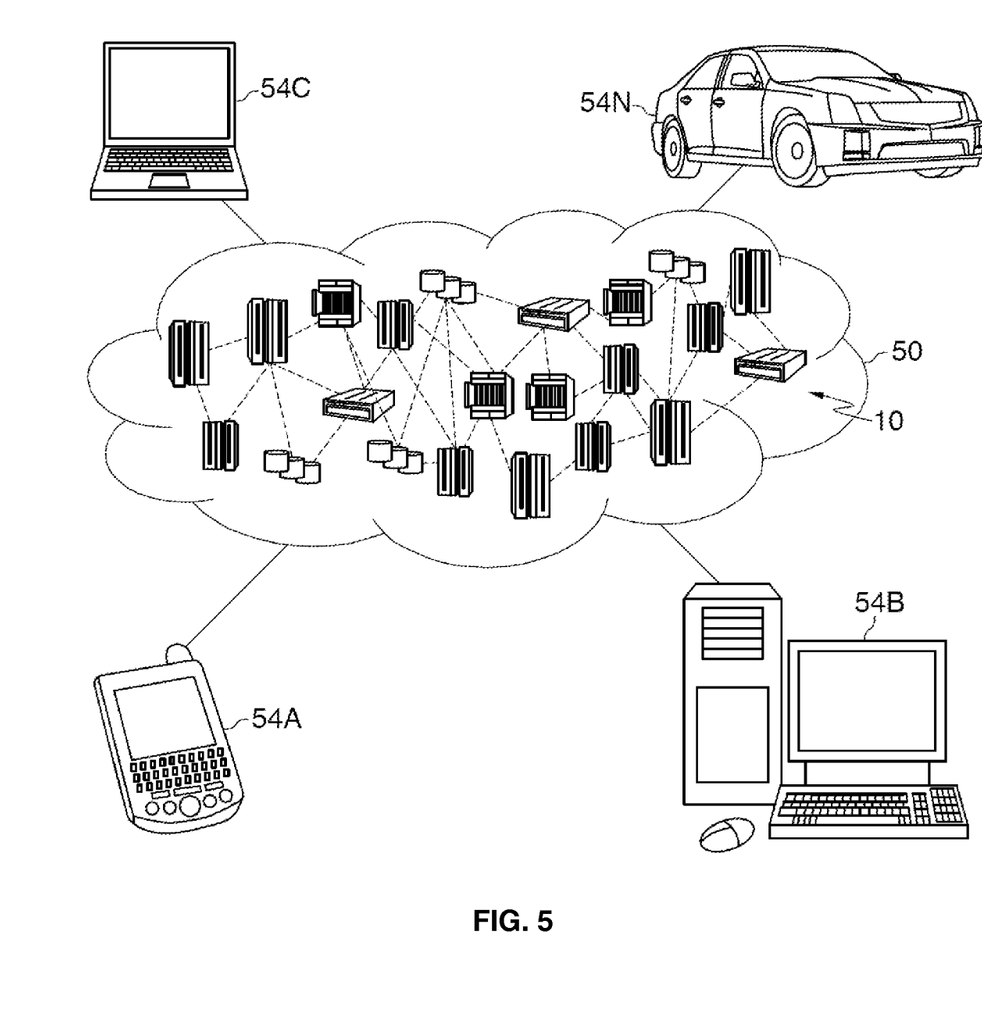
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
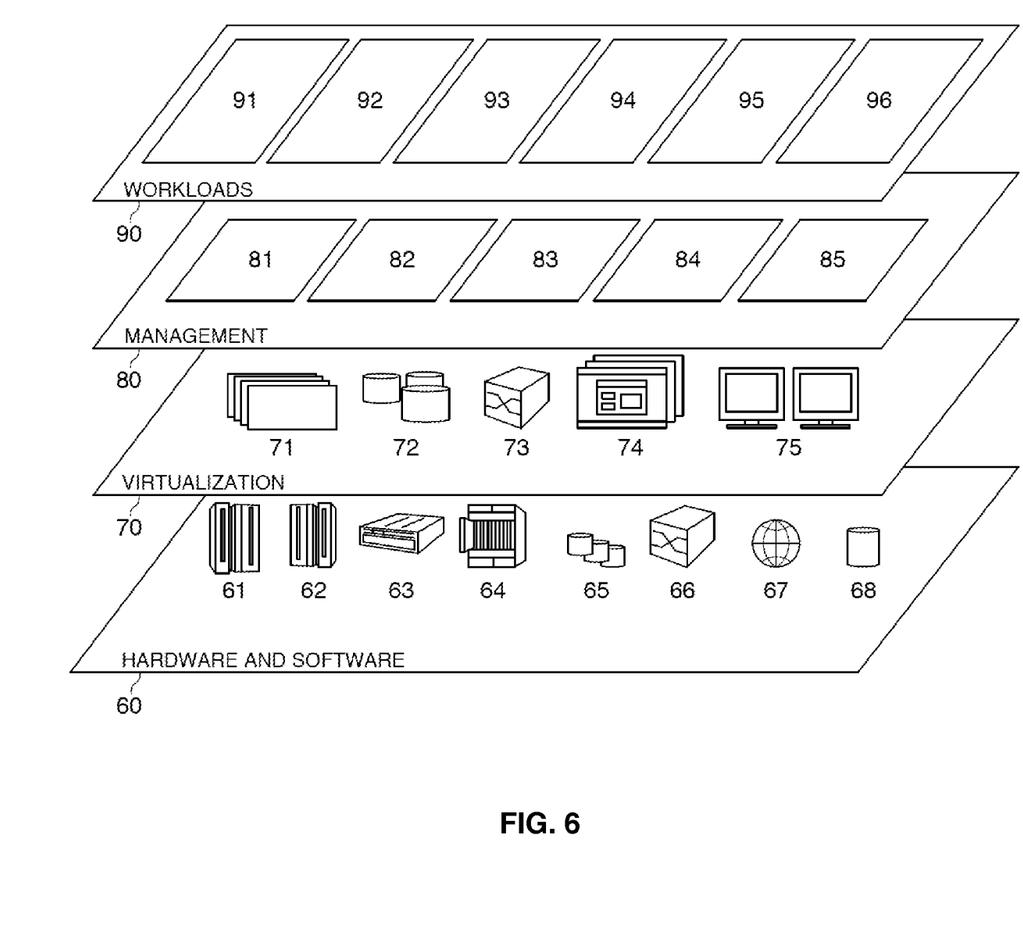
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing resource allocating 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for allocating one or more computing resources, the method comprising:
   collecting data of one or more users, wherein the collected data comprises a combination of usage data, sensor data, and computing resource allocation data associated with the usage data and the sensor data, and wherein the sensor data further comprises audio and video data of user interaction with a computing device;
   extracting one or more features from the collected data, wherein the extracted one or more features further comprises information associated with one or more computing tasks;
   correlating the collected data and the extracted one or more features with one or more computing resources; and
   automatically allocating the one or more computing resources to one or more of the users using one or more models based on the correlation with the extracted one or more features and the collected data.

2. The method of claim 1, further comprising:
   notifying one or more of the users of the allocation.

3. The method of claim 1, wherein:
   the one or more computing resources include one or more of processing memory, internet bandwidth, and power.

4. The method of claim 1, further comprising:
   receiving feedback indicative of whether the allocation was appropriate; and adjusting the one or more models based on the received feedback.

5. The method of claim 1, further comprising:
collecting training data;
extracting training features from the training data; and
training the one or more models based on the extracted training features.

6. The method of claim 1, wherein the one or more features include one or more features from the group comprising computing tasks, projected start times, projected completion times, durations, workflow sequences or dependencies, computing resources required, non-computing resources required, and priority levels.

7. A computer program product for allocating one or more computing resources, the computer program product comprising:
one or more non-transitory computer-readable storage media and program instructions stored on the one or more non-transitory computer-readable storage media capable of performing a method, the method comprising:
collecting data of one or more users, wherein the collected data comprises a combination of usage data, sensor data, and computing resource allocation data associated with the usage data and the sensor data, and wherein the sensor data further comprises audio and video data of user interaction with a computing device;
extracting one or more features from the collected data, wherein the extracted one or more features further comprises information associated with one or more computing tasks;
correlating the collected data and the extracted one or more features with one or more computing resources; and
automatically allocating the one or more computing resources to one or more of the users using one or more models based on the correlation with the extracted one or more features and the collected data.

8. The computer program product of claim 7, further comprising:
notifying one or more of the users of the allocation.

9. The computer program product of claim 7, wherein:
the one or more computing resources include one or more of processing memory, internet bandwidth, and power.

10. The computer program product of claim 7, further comprising:
receiving feedback indicative of whether the allocation was appropriate; and
adjusting the one or more models based on the received feedback.

11. The computer program product of claim 7, further comprising:
collecting training data;
extracting training features from the training data; and
training the one or more models based on the extracted training features.

12. The computer program product of claim 7, wherein the one or more features include one or more features from the group comprising computing tasks, projected start times, projected completion times, durations, workflow sequences or dependencies, computing resources required, non-computing resources required, and priority levels.

13. A computer system for allocating one or more computing resources, the computer system comprising:
one or more computer processors, one or more computer-readable storage media, and program instructions stored on the one or more of the computer-readable storage media for execution by at least one of the one or more processors capable of performing a method, the method comprising:
collecting data of one or more users, wherein the collected data comprises a combination of usage data, sensor data, and computing resource allocation data associated with the usage data and the sensor data, and wherein the sensor data further comprises audio and video data of user interaction with a computing device;
extracting one or more features from the collected data, wherein the extracted one or more features further comprises information associated with one or more computing tasks;
correlating the collected data and the extracted one or more features with one or more computing resources; and
automatically allocating the one or more computing resources to one or more of the users using one or more models based on the correlation with the extracted one or more features and the collected data.

14. The computer system of claim 13, further comprising:
notifying one or more of the users of the allocation.

15. The computer system of claim 13, wherein:
the one or more computing resources include one or more of processing memory, internet bandwidth, and power.

16. The computer system of claim 13, further comprising:
receiving feedback indicative of whether the allocation was appropriate; and
adjusting the one or more models based on the received feedback.

17. The computer system of claim 13, further comprising:
collecting training data;
extracting training features from the training data; and
training the one or more models based on the extracted training features.

* * * * *